US010417597B2

(12) United States Patent
Flores et al.

(10) Patent No.: US 10,417,597 B2
(45) Date of Patent: Sep. 17, 2019

(54) ENABLING SYNCHRONICITY BETWEEN ARCHITECTURAL MODELS AND OPERATING ENVIRONMENTS

(75) Inventors: Romelia H. Flores, Keller, TX (US); Leonard S. Hand, Rochester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1096 days.

(21) Appl. No.: 13/611,065

(22) Filed: Sep. 12, 2012

(65) Prior Publication Data

US 2014/0074749 A1 Mar. 13, 2014

(51) Int. Cl.
*G06Q 10/06* (2012.01)

(52) U.S. Cl.
CPC .................. *G06Q 10/067* (2013.01)

(58) Field of Classification Search
CPC .. G06F 9/44; G06F 3/00; G06F 17/30; G06Q 10/00
See application file for complete search history.

(56) References Cited

U.S. PATENT DOCUMENTS

| | | | |
|---|---|---|---|
| 5,560,012 A | 9/1996 | Ryu et al. | |
| 5,917,730 A | 6/1999 | Rittle et al. | |
| 7,003,560 B1 | 2/2006 | Mullen et al. | |
| 7,822,594 B2 * | 10/2010 | Haviv et al. | 703/21 |
| 8,234,223 B1 | 7/2012 | Maginniss | |
| 8,253,753 B1 | 8/2012 | Baraff et al. | |
| 9,383,900 B2 | 7/2016 | Flores et al. | |
| 2002/0133809 A1 | 9/2002 | Hills | |
| 2005/0091093 A1 | 4/2005 | Bhaskaran et al. | |
| 2006/0069717 A1 * | 3/2006 | Mamou et al. | 709/203 |
| 2006/0080289 A1 * | 4/2006 | Brunswig et al. | 707/3 |
| 2006/0242103 A1 | 10/2006 | Chavda | |
| 2007/0006177 A1 * | 1/2007 | Aiber | G06Q 10/10 717/136 |
| 2009/0192867 A1 | 7/2009 | Farooq et al. | |
| 2010/0057766 A1 | 3/2010 | Hartley et al. | |
| 2010/0110933 A1 | 5/2010 | Wilcock et al. | |
| 2010/0281455 A1 | 11/2010 | Anand et al. | |

(Continued)

OTHER PUBLICATIONS

"Business Process Model and Notation (BPMN)," Object Management Group, Inc. © 1997-2016, Jan. 2011, [retrieved Mar. 28, 2016] retrieved from the Internet: <http://www.omg.org/spec/BPMN/2.0/PDF>, 538 pg.

(Continued)

*Primary Examiner* — Maria C Santos-Diaz
(74) *Attorney, Agent, or Firm* — Cuenot, Forsythe & Kim, LLC

(57) ABSTRACT

An operational environment and an enterprise model within an enterprise organization can be identified. The model can include an entity which can be a structure, an activity, a process, information, a resource, a goal, or a constraint of the organization. The environment can include an element which can be a computing resource or a computing resource state associated with the organization. A super model can be created. The super model can be a meta-model of the enterprise model. The super model can be a common component of the enterprise model and the environment. The super model can be synchronized in real time with the environment and the enterprise model.

15 Claims, 3 Drawing Sheets

(56) References Cited

U.S. PATENT DOCUMENTS

| | | |
|---|---|---|
| 2010/0318836 A1 | 12/2010 | Ness et al. |
| 2011/0061013 A1 | 3/2011 | Bilicki et al. |
| 2011/0066565 A1 | 3/2011 | Day |
| 2011/0153636 A1* | 6/2011 | Coldicott et al. ............. 707/769 |
| 2011/0196719 A1 | 6/2011 | Bhandari et al. |
| 2011/0231817 A1 | 9/2011 | Hadar et al. |
| 2012/0072884 A1 | 3/2012 | Balko et al. |
| 2012/0102032 A1 | 4/2012 | Byrne et al. |
| 2012/0137165 A1 | 5/2012 | Wu et al. |
| 2012/0296624 A1 | 11/2012 | Jeng et al. |
| 2013/0232464 A1 | 9/2013 | Jacquin et al. |
| 2013/0246858 A1 | 9/2013 | Ceglia et al. |
| 2013/0282746 A1 | 10/2013 | Balko et al. |
| 2014/0075357 A1 | 3/2014 | Flores et al. |
| 2016/0315823 A1 | 10/2016 | Flores et al. |

OTHER PUBLICATIONS

U.S. Appl. No. 13/611,005, Non-Final Office Action dated Apr. 29, 2014, 21 pg.

U.S. Appl. No. 13/611,005, Final Office Action dated Jul. 15, 2014, 20 pg.

U.S. Appl. No. 13/611,005, Non-Final Office Action dated Nov. 21, 2014, 21 pg.

U.S. Appl. No. 13/611,005, Final Office Action dated Jun. 19, 2015, 28 pg.

U.S. Appl. No. 13/611,005, Notice of Allowance, dated Mar. 28, 2016, 5 pg.

U.S. Appl. No. 15/201,481, NonFinal Office Action, dated Sep. 21, 2018, 14 pg.

U.S. Appl. No. 15/201,481, Final Office Action, dated Jan. 18, 2019. 15 pg.

\* cited by examiner

ENABLING SYNCHRONICITY BETWEEN ARCHITECTURAL MODELS AND OPERATING ENVIRONMENTS

BACKGROUND

The present invention relates to the field of model driven architecture and, more particularly, to enabling synchronicity between architectural models and operating environments.

Traditionally, operation centers (OCs) run and manage an enterprise environment through a plethora of management tool dashboards. These dashboards are often built and updated via rules based discovery processes on the actual environment. Typically, the OC team can view the environment as a reflection of the "running" operational environment and the assets contained within the environment. The OC can group assets based on asset types, geography, lines of business, network connections, grid location, security zones, etc. Measurements (e.g., metrics) can be gathered on these assets and recorded for availability, capacity, and/or service level management. The OC can observe and manage (e.g., via one or more dashboards) the operational state of an environment based on operational measurements Today's enterprise architects spend a great deal of time creating and perfecting solution design architectures based on business requirements and strategy. Architects often create Enterprise Architectures documenting their software, hardware, and other enterprise standards. These requirements, strategy, and standards provide constraints which drive functional and nonfunctional requirements for a particular solution to operate successfully within the enterprise. These requirements also drive use cases which in turn drive components and service models all the way to the operational model nodes and deployment units.

This documentation unfortunately becomes "throwaway" architecture work once a system is deployed because typically the architect or the design documents are no longer involved when the system is handled by IT operations. IT operations frequently have IT specific documenting and views of the environment. For example, typically only Service Level Agreement (SLA) requirements are carried over from the design as a part of the operational documentation. Even rigorous change control rarely returns to the design documents for verification, guidance, and direction. This can lead to a divergence between the IT operational environment and the originally designed solution architecture. Further, this divergence can create a lack of focus for updates and change control. It also virtually eliminates any effective feedback loop from design to implementation as well as the original design architects and IT Operations.

BRIEF SUMMARY

One aspect of the present invention can include a system, an apparatus, a computer program product, and a method for enabling synchronicity between architectural models and operating environments. One or more operational environments and an enterprise model within an enterprise organization can be identified. The model can include an entity which can be a structure, an activity, a process, information, a resource, a goal, or a constraint of the organization. The environment can include an element which can be a computing resource or a computing resource state associated with the organization. A super model can be created. The super model can be a meta-model of the enterprise and contain views of information pertaining to one or more operation solution environments. The super model can be a common component of the enterprise model and can represent the various operational environments. The super model can be synchronized in real time with the operational environment and provide a comprehensive view across the entire enterprise.

Another aspect of the present invention can include an apparatus, a computer program product, a method, and a system for enabling synchronicity between architectural models and operating environments. A model engine can be configured to establish a super model associated with an enterprise model and an operational environment of an enterprise organization. The super model can be a meta-model of the enterprise model. The super model can include one common component of the enterprise model and the operational environment. The enterprise model can include an entity which can be a structure, an activity, a process, information, a resource, a goal, or a constraint of an enterprise organization. The operational environment can include an element which can be a computing resource or a computing resource state associated with the enterprise organization. A data store can persist and can be a synchronization ruleset, a mapping, an inferred relationship and the super model.

DETAILED DESCRIPTION

Figure 1:
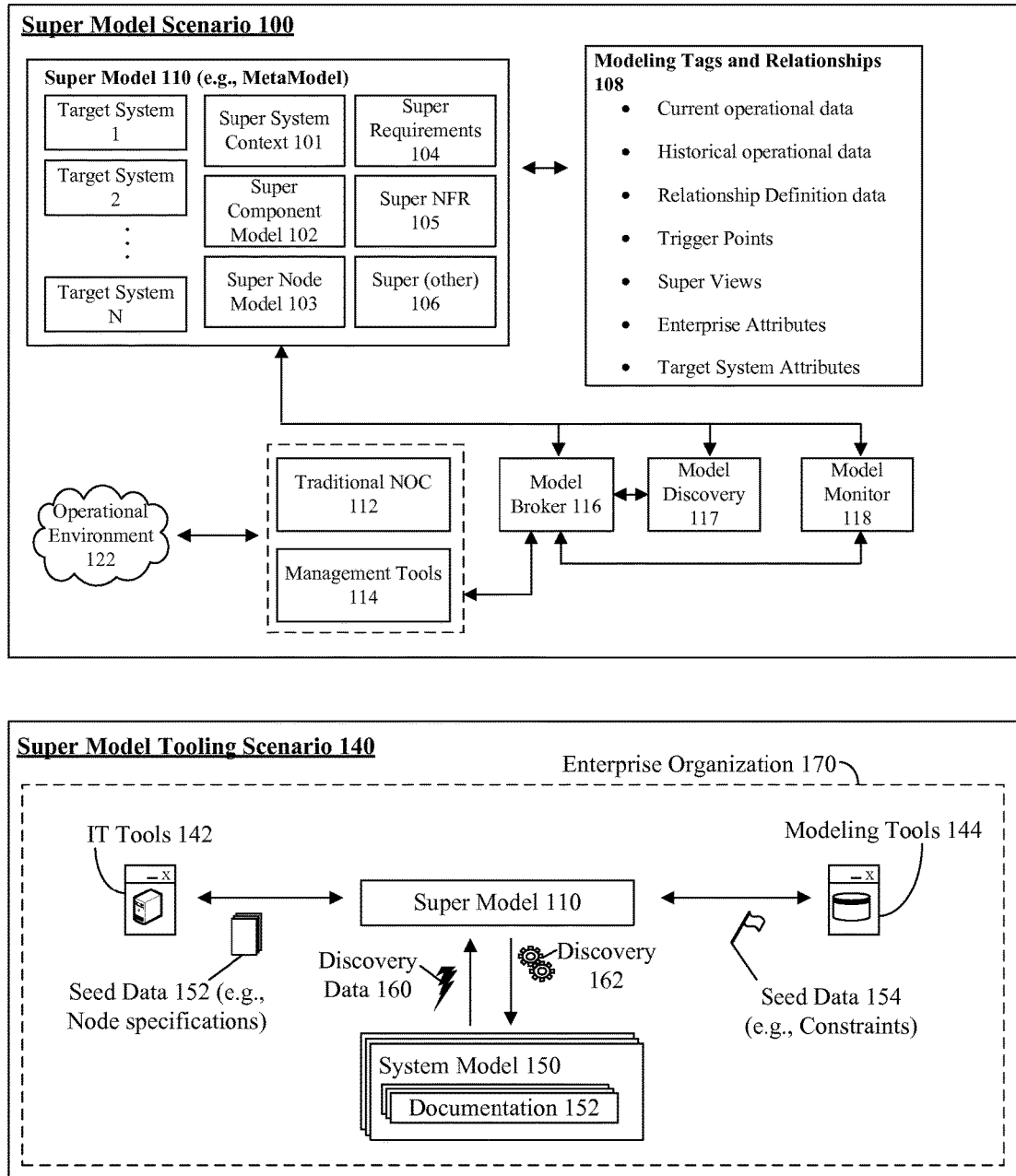
FIG. 1 is a schematic diagram illustrating a set of scenarios for enabling synchronicity between architectural models and operating environments in accordance with an embodiment of the inventive arrangements disclosed herein.

The present disclosure is a solution for enabling synchronicity between architectural models and operating environments. In the solution, a super model (e.g., meta-model) can be utilized to capture common elements of an operational environment and/or an enterprise model. The super model can be synchronized in real-time via a model engine. In one embodiment, the engine can determine inferred relationships among target systems within the super model. That is, non-obvious relationships can be discovered to assist architects and/or operational teams in determining system context, constraints, and/or requirements. For example, the super model can be leveraged to ensure the conformity of architectural design across multiple enterprise projects.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 100, 140 for enabling synchronicity between architectural models and operating environments in accordance with an embodiment of the inventive arrangements disclosed herein. Scenarios 100, 140 can be present in the context of method 200, and/or system 300. It should be appreciated that scenarios 100, 140 can address traditional shortcomings of enterprise management and design by converting architecture design (e.g., documentation 152) into a living document (e.g., super model 110). That is, a continuous link from an operational environment 122 to an architectural model (e.g., super model 110) can be established to perpetuate changes between the environment 122 and the super model 110 of an enterprise organization 170. For example, as the operational environment changes, checks against the super model 110 non-functional, constraints, and/or business objectives of the environment can be made to ensure the super model 110 can reflect environment 122 changes. That is, the disclosure enables an architect the ability to validate design and monitor the impact of the changes on architectural decisions and other design constraints. Conversely, the disclosure also provides a means for an IT operational personnel to understand the impact of change and release management on the design.

In one embodiment, the disclosure can permit constraints of multiple systems (e.g., target system 1, 2, . . . N) to be presented. In the embodiment, historic configurations can be compared to a current configuration enabling design and/or operational changes to be easily identified. In another embodiment, the disclosure can permit constraints of a past design to be updated or deprecated permitting easy change management.

As used herein, super model 110 can be a simplified and/or approximated descriptive model of another descriptive model (e.g., a system model 150). For example, super model 110 can be a meta-model associated with one or more system models 150. In one instance, model 110 can include, but is not limited to, a target system, a super context, a super model component, a super model node, a super functional requirement, a super non-functional requirement, and the like. In the instance, an element of model 110 can describe a member of a system model 150. In one instance, the super model 110 can conform to a International Organization for Standardization/International Electrotechnical Commission (ISO/IEC) standards. In the instance, the super model can comply with a Meta-Object Facility (MOF) architecture. It should be appreciated that model 110 can conform to a Unified Modeling Language (UML), an Extensible Markup Language (XML) Metadata Interchange (XMI), a Common Warehouse Model (CWM), and the like.

As used herein, a system model 150 can be a collection of entities representing target systems including, but is not limited to, a target system, a context, a model component, a model node, a functional requirement, a non-functional requirement, and the like. The operational environment 122 can be a collection of elements including, but not limited to, a computing resource and/or a computing resource state associated with the enterprise organization. Elements can include, but is not limited to, a computing device, a computing environment, a distributed computing environment, a virtual computing environment, and the like. It should be appreciated that environment 122 can include one or more computing systems, computing devices, and the like. For example, environment can be an electronic mail server system.

Target system 1,2 . . . N can be an abstract representation of one or more nodes of an operational environment, one or more models, and the like. It should be appreciated that target system 1,2 . . . N can be associated with a single enterprise model and/or multiple enterprise models.

In scenario 100, a super model 110 can include modeling tags and relationships 108 which can permit the disclosure to extend the capabilities of traditional management tools 114. That is, the disclosure can utilize meta-model objects (e.g., super system context 101) to identify "super" views of information and relationships which can provide a view of the obvious and non-obvious relationships (e.g., inferred relationships) between target systems. In one embodiment, the disclosure can enable merging of the various projects into one enterprise view.

Meta-model elements 101-106 can enable the identification of the nodes (e.g., components, deployment units, etc) that can be monitored in an operational environment. In one embodiment, user input (e.g., architect, IT Operations personnel) can provide appropriate information to enable the appropriate monitoring of the super model and environment via the augmented and additional model objects (e.g., Modeling Tags and Relationships 108). For example, the model 110 can be seeded (e.g., data 152, 154) with values to help discovery 162. The information supplied can include node specifications, appropriate threshold values, trigger points, and/or specific interrelationships to be monitored. Modeling tags and relationships 108 can include, but is not limited to, current operational data, historical operational data, relationship definition data, trigger points, unified views (e.g., "super" view), enterprise attributes, target system attributes, and the like.

In scenario 100, super model elements can be available for use by the model broker 116, model discovery 117, and model monitor 118. Discovery 117 can consume the elements, which can be identified in the super model 110. Discovery 117 can ensure correct mapping between traditional Information Technology (IT) operational monitoring tools (e.g., Traditional Network Operations Center 112, Tools 142) and management tools with the super model 110 elements. Discovery 117 can be informed of new, updated, or deleted super model elements via one or more notification mechanisms. Discovery 117 can maintain a "list" operational environments and super model objects which can be monitored. In one embodiment, discovery 117 can leverage the broker 116 component to complete discovery 162 tasks.

Broker 116 can link with traditional network operation center 112 and management tools 114 to enable the monitoring and discovery of appropriate operational environment and super model objects. In one embodiment, broker 116 can serve as an interface to the existing management tools 114. For example, broker 116 can be similar to an enterprise bus. The broker 116 can perform basic connectivity tasks via at multitude of standard protocols including, but not limited to, ICMP, SSH, SNMP, Web Services, and the like.

Monitor 118 can provide continuous synchronization of the model 110 and the operational environment 122. Monitor 118 can perform traditional and/or proprietary monitoring including to monitoring by duration/interval, logging capabilities, graphing functionality, and the like. Monitor 118 can share current operational data with the super model 110 elements available in an enterprise modeling tool (e.g., tool 144). Monitor 118 can leverage the "list" of super model 110 elements (e.g., including those created by the discovery 117) and traditional NOC and management system relationships.

In super model tooling scenario 140, super model 110 can permit end-to-end enterprise management through IT tools 142 and modeling tools 144. In one instance, seed data 152, 154 can be provided to enable discovery 162 process to obtain discovery data 160 from system model 150. For example, tools 142, 144 can permit node specification information and/or constraints to be established for discovery 162 parameters. In the instance, discovery data 160 can determine inferred relationships between components of the enterprise model and/or nodes of an operational environment 122. For example inferred relationships can provide insight into non-obvious relationships between components of a model of a software project which can permit resource reuse and reduce project costs. In one instance, discovery 162 can utilize modeling tags to determine inferred relationships.

In one embodiment, discovery 162 can be guided by one or more rules (e.g., synchronization ruleset 342). In the embodiment, the rules can be manually and/or heuristically established based on model 150 component metadata, user established parameters, and the like.

In scenario 140, as super model 110 changes, model information within tools 142, 144 can be updated to reflect the changes. For example, if an enterprise model 150 is modified and the change can be propagated to super model 110, tools 142, 144 can be synchronized in real-time. It should be appreciated that tools 142, 144 can interact with super model 110 to enable super model 110 modification, reorganization, and the like.

Drawings presented herein are for illustrative purposes and should not be construed to limit the invention in any regard. In one instance, super model 110 can support multiple enterprise models, multiple environments 122, and the like. In one embodiment, super model 110 can be an ontology of model 150. It should be appreciated that discovery data 160 can include attribute data, tag data, relationship data, and the like.

Figure 2:
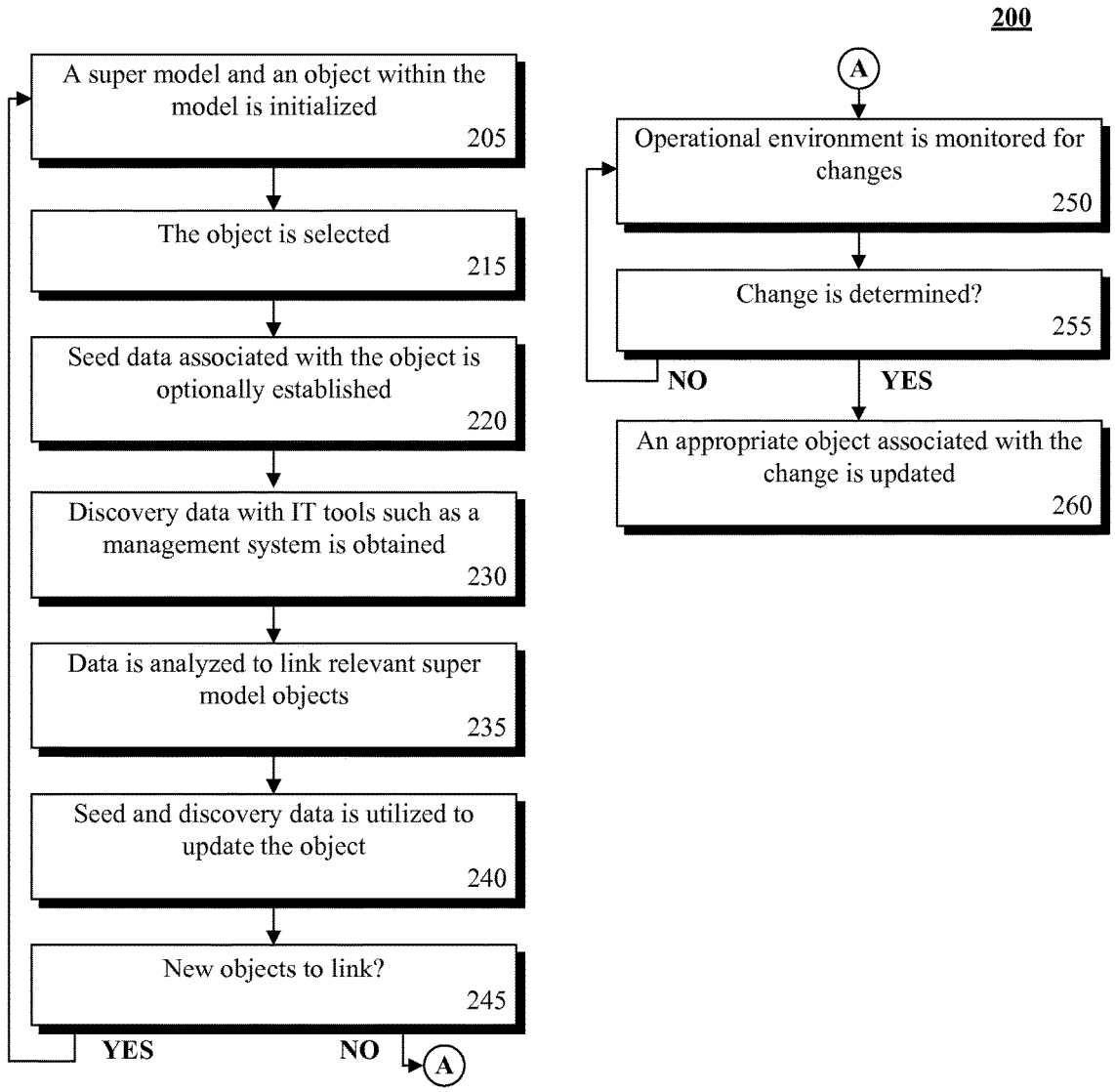
FIG. 2 is a schematic diagram illustrating a method for enabling synchronicity between architectural models and operating environments in accordance with an embodiment of the inventive arrangements disclosed herein.

FIG. 2 is a schematic diagram illustrating a method for enabling synchronicity between architectural models and operating environments in accordance with an embodiment of the inventive arrangements disclosed herein. Method 200 can be performed in the context of scenario 100, 140, and/or system 300. In method 200, a super model can be initialized to enable synchronicity between an operational environment and an enterprise super model. The super model can be populated utilizing seed data and/or discovery data obtained from the enterprise super model and/or operational environment. The environment can be monitored for changes which can be applied to the super model permitting a continuous feedback loop to occur between the environment and the super model.

In step 205, a super model can be initialized. Initialization can include, but is not limited to, object creation, assignment, and the like. In this step, an object within the super model can be initialized. Initialization can include, but is not limited to, object creation, attribute population, and the like for objects such as target systems, system context, component model, node model, etc. In step 215, the object can be selected. Selection can be performed in alphabetically, by type, randomly, and the like. For example, selection can be performed by object related to a target system or a particular system context, etc. In step 220, seed data associated with the object can be optionally established. Seed data can include, but is not limited to, metadata, trigger values, and the like. In step 230, discovery data associated with IT tools such as a management system can be obtained. In step 235, data can be analyzed to link relevant super model objects. In step 240, seed and discovery data can be utilized to update the object appropriately or notify the user of objects in the super model that require validation. In step 245, if there are new objects to link, the method can return to step 205, else continue to step 250. In step 250, the operational environment can be monitored for changes. In step 255, if a change is determined, the method can continue to step 260. In step 260, an appropriate object associated with the change can be updated.

Drawings presented herein are for illustrative purposes only and should not be construed to limit the invention in any regard. Method 200 can be performed in real-time or near real-time. Method 200 can be performed in parallel or in serial. In one instance, the method 200 can be performed automatically during an enterprise management lifecycle enabling inconsistencies between the operational environment and the super model to be quickly identified and reconciled.

Figure 3:
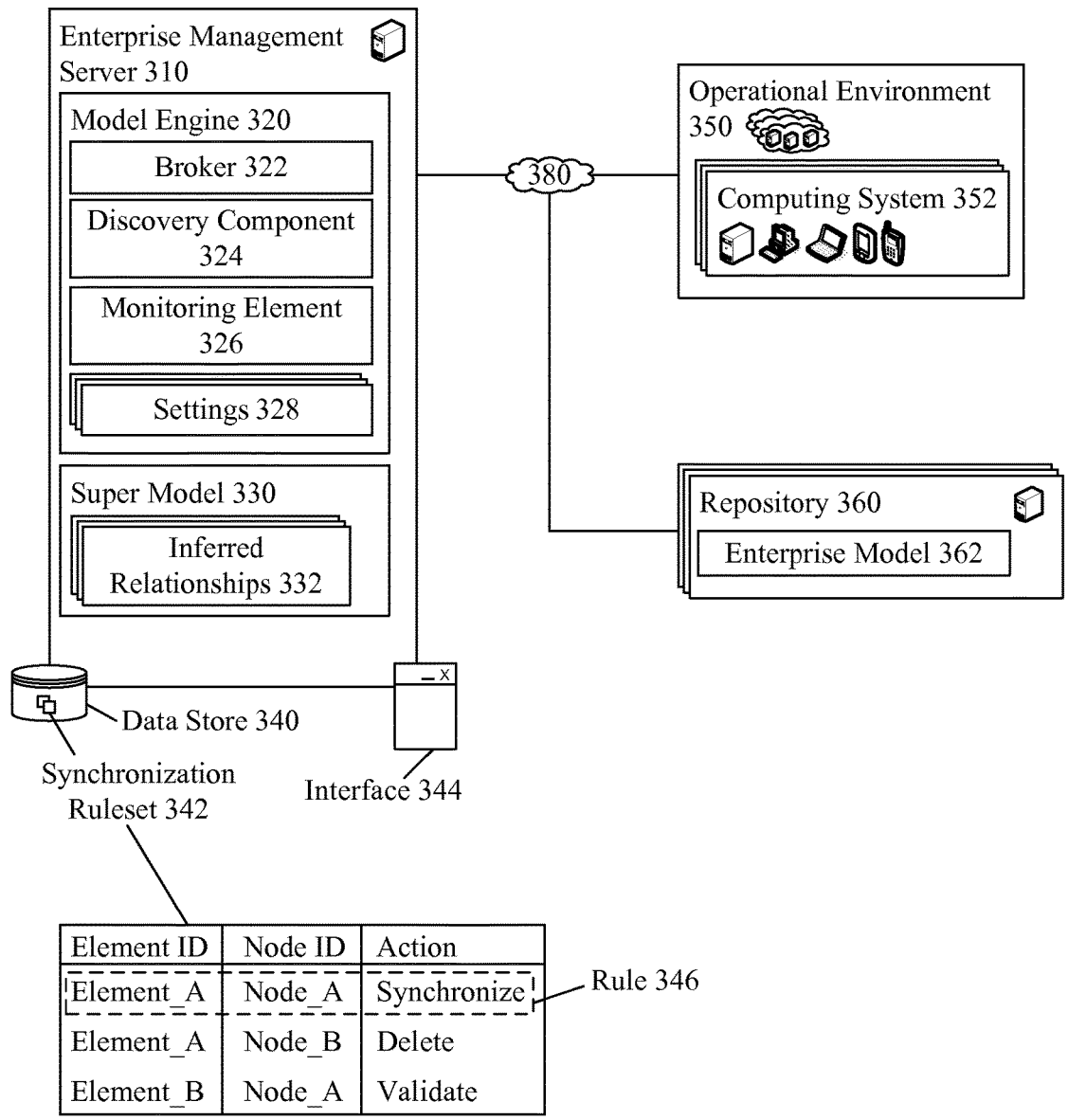
FIG. 3 is a schematic diagram illustrating a system for enabling synchronicity between architectural models and operating environments in accordance with an embodiment of the inventive arrangements disclosed herein.

FIG. 3 is a schematic diagram illustrating a system for enabling synchronicity between architectural models and operating environments in accordance with an embodiment of the inventive arrangements disclosed herein. System 300 can be present in the context of scenario 100, 140, and/or method 200. In system 300, a model engine 320 can permit communication, discovery, synchronization, and monitoring of model 330 and environment 350.

Enterprise management server 310 can be a hardware/software entity for executing a model engine 320. Server 310 can include, but is not limited to, model engine 320, super model 330, data store 340, interface 344, and the like. Server 310 functionality can include, but is not limited to, session management, authentication, encryption, and the like. Server 310 can include, but is not limited to, IBM SMART CLOUD MONITORING server, IBM TIVOLI MONITORING server, and the like.

Model engine 320 can be a hardware/software element for maintaining super model 330. Engine 320 can include, but is not limited to, broker 322, discovery component 324, monitoring element 326, settings 328, and the like. It should be appreciated that components 322 can be similar and/or identical to components 116-118. It should be appreciated that components 322-326 can be optional components permitting engine 320 functionality is retained. In one embodiment, model engine 320 can be a component of an IBM ECLIPSE software.

Broker 322 can be a hardware/software component for enabling connectivity between operational environments 350, computing systems 352, and/or repository 360. Broker 322 functionality can include, but is not limited to, Data Extraction Transformation & Loading (ETL), and the like. In one embodiment, broker 322 can utilize any application communication technique.

Discovery component 324 can be a hardware/software element for performing discovery on model 330, model 362, and/or operational environment 350. Component 324 functionality can include, data analysis, data organization, metadata discovery, and the like. Component 324 can discover an attribute, an inferred relationship, an explicit relationship, an operation, a constraint, and the like. In one instance, component 324 can perform discovery on JAVA interfaces, Unified Modeling Language (UML) class diagrams, Extensible Markup Language (XML) schemas, and the like.

Monitoring element 326 can be a hardware/software component for executing monitoring activities on model 330, environment 350, and/or model 362. Element 326 functionality can include, but is not limited to, metric collection, trend detection, data visualization, notification functionality, and the like. Element 326 can permit real-time or near real-time monitoring of model 330, model 362 and/or operational environment 350. Element 326 can conform to traditional and/or proprietary change control monitoring.

Settings 328 can be one or more rules for establishing the behavior of system 300, server 310, and/or engine 320. Settings 328 can include, but is not limited to, broker 322 options, discovery component 324 settings, monitoring element 326 options, model 330 settings, model 362 options, environment 350 settings, and the like. Settings 328 can be manually and/or automatically established. In one instance, settings 328 can be heuristically determined. In one instance, settings 328 can be presented within interface 344. For example, settings 328 can be presented within a dashboard of an operational management software.

Super model 330 can be persisted within data store 340 and/or repository 360. In one instance, model 330 can include inferred relationships 332 which can be automatically determined. Model 330 can include imported elements, user created elements, and the like. Model 330 can be synchronized in real-time or near real-time. In one embodiment, model 330 can be associated with persistence, serialization, a reflection Application Programming Interface (API), a runtime support for generated models, a change model, a validation framework, and the like. It should be appreciated that super model 330 can include, inferred objects, elements, nodes, attributes, operations, constraint, and the like.

Data store 340 can be a hardware/software component able to store synchronization ruleset 342, settings 328, element 326, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) compliant database.

Synchronization ruleset 342 can be one or more rulest for maintaining model 330 concurrency. Ruleset 342 can be dynamically and/or statically generated from model 362 and/or environment 352 rulest/settings. Ruleset 342 can include, but is not limited to, an element identifier, a node identifier, an action, a trigger point, synchronization data, a status indicator, a timestamp, and the like. For example, ruleset 342 can include a rule 346 indicating Element_A and Node_A can be synchronized.

Interface 344 can be a user interactive component permitting presentation of settings 328, inferred relationships 332, model 330, model 362, and/or synchronization ruleset 342. In one instance, interface 344 can be present in the context of an IBM RATIONAL SYSTEM ARCHITECT software, and the like. Interface 344 capabilities can include a graphical user interface (GUI), voice user interface (VUI), mixed-mode interface, a text-based interface, and the like. In one instance, interface 344 can be communicatively linked to server 310.

Operational environment 350 can be one or more computing environments communicatively linked to enterprise management server 310. Environment 350 can be geographically distant and/or proximate to server 310. Environment 350 can include one or more heterogeneous computing systems 352. Environment 350 can include one or more enterprise organizations. Computing systems 352 can be communicatively linked via one or more traditional and/or proprietary mechanisms. Computing systems 352 can include one or more computing devices which can be geographically distant and/or proximate to each other.

Repository 360 can be one or more data stores able to persist an enterprise model 362. Repository 360 can be a Storage Area Network (SAN), Network Attached Storage (NAS), and the like. Repository 360 can conform to a relational database management system (RDBMS), object oriented database management system (OODBMS), and the like. Repository 360 can be communicatively linked to server 310 in one or more traditional and/or proprietary mechanisms. In one instance, repository 360 can be a component of Structured Query Language (SQL) compliant database.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), VPN and the like.

Drawings presented herein are for illustrative purposes only and should not be construed to limit the invention in any regard. One or more components of engine 320 can be present and/or optionally omitted permitting the functionality of the engine 320 is retained. It should be appreciated that one or more components of engine 320 can be combined and/or separated based on functionality, usage, and the like. In one instance, system 300 can conform to a Service Oriented Architecture (SOA).

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for enterprise management, comprising:
    identifying an operational environment including a computing system;
    identifying an enterprise model within an enterprise organization;
    creating a super model including at least one common component of the enterprise model and the operational environment; and
    synchronizing the super model with the operational environment and the enterprise model, wherein
    the super model is a meta-model of the enterprise model.

2. The method of claim 1, wherein
    the super model includes at least one inferred relationship between a component of the enterprise model and a node of the operational environment.

3. The method of claim 1, further comprising:
    monitoring for changes within the operational environment.

4. The method of claim 3, wherein
    the super model is synchronized in real time based upon the monitored changes.

5. The method of claim 1, wherein
    documentation of an architectural design is used to create the super model.

6. A computer hardware system for enterprise management, comprising:
    a hardware processor configured to initiate the following executable operations:
        identifying an operational environment including a computing system;
        identifying an enterprise model within an enterprise organization;
        creating a super model including at least one common component of the enterprise model and the operational environment; and
        synchronizing the super model with the operational environment and the enterprise model, wherein
    the super model is a meta-model of the enterprise model.

7. The system of claim 6, wherein
    the super model includes at least one inferred relationship between a component of the enterprise model and a node of the operational environment.

8. The system of claim 6, wherein the executable operations further include:
    monitoring for changes within the operational environment.

9. The system of claim 8, wherein
    the super model is synchronized in real time based upon the monitored changes.

10. The system of claim 6, wherein
    documentation of an architectural design is used to create the super model.

11. A computer program product, comprising:
    a computer readable hardware storage medium having stored therein computer readable program code,
    the computer readable program code, which when executed by a source computer device, causes the source computer device to perform:
        identifying an operational environment including a computing system;

identifying an enterprise model within an enterprise organization;

creating a super model including at least one common component of the enterprise model and the operational environment; and synchronizing the super model with the operational environment and the enterprise model, wherein the super model is a meta-model of the enterprise model.

12. The computer program product of claim 11, wherein the super model includes at least one inferred relationship between a component of the enterprise model and a node of the operational environment.

13. The computer program product of claim 11, wherein the computer readable program code further causes the source computer device to perform:

monitoring for changes within the operational environment.

14. The computer program product of claim 13, wherein the super model is synchronized in real time based upon the monitored changes.

15. The computer program product of claim 11, wherein documentation of an architectural design is used to create the super model.

\* \* \* \* \*